US011485408B2

(12) United States Patent
Balogh

(10) Patent No.: US 11,485,408 B2
(45) Date of Patent: Nov. 1, 2022

(54) HARDWARE IMPLEMENTED MOTOR CONTROL AND PLATFORM FOR EPS

(71) Applicants: thyssenkrupp Presta AG, Eschen (LI); thyssenkrupp AG, Essen (DE)

(72) Inventor: András Balogh, Tördas (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 330 days.

(21) Appl. No.: 16/638,935

(22) PCT Filed: Aug. 30, 2017

(86) PCT No.: PCT/EP2017/071747
§ 371 (c)(1),
(2) Date: Feb. 13, 2020

(87) PCT Pub. No.: WO2019/042538
PCT Pub. Date: Mar. 17, 2019

(65) Prior Publication Data
US 2020/0223474 A1 Jul. 16, 2020

(51) Int. Cl.
*B62D 6/00* (2006.01)
*B62D 5/04* (2006.01)

(52) U.S. Cl.
CPC ......... *B62D 5/0463* (2013.01); *B62D 5/0484* (2013.01); *B62D 5/0409* (2013.01); *B62D 5/0466* (2013.01); *B62D 5/0472* (2013.01); *B62D 6/008* (2013.01); *F16C 2326/24* (2013.01)

(58) Field of Classification Search
CPC .. B62D 5/0463; B62D 5/0484; B62D 5/0409; B62D 5/0466; B62D 5/0472; B62D 6/008; B62D 5/04; B62D 6/00; F16C 2326/24

USPC .......................................................... 701/41
See application file for complete search history.

(56) References Cited

U.S. PATENT DOCUMENTS

| 6,068,078 A * | 5/2000 | Rau ...................... B62D 5/0457 318/489 |
| 6,397,969 B1 * | 6/2002 | Kasai ....................... B62D 5/049 180/404 |
| 2011/0285335 A1 * | 11/2011 | Tada ........................ H02M 1/32 318/400.3 |

(Continued)

FOREIGN PATENT DOCUMENTS

| CN | 1295001 A | 5/2001 |
| CN | 201901171 U | 7/2011 |
| CN | 104584421 A | 4/2015 |

(Continued)

OTHER PUBLICATIONS

English Translation of International Search Report issued in PCT/EP2017/071747, dated Apr. 25, 2018.

(Continued)

*Primary Examiner* — Shardul D Patel
(74) *Attorney, Agent, or Firm* — thyssenkrupp North America, LLC

(57) ABSTRACT

A motor electric control unit (ECU) for an electromechanical power steering mechanism, which controls current through an electric assist motor in response to sensed vehicle signals, wherein the ECU comprises an application specific integrated circuit (ASIC) design, that implements safety and platform features in hardware.

9 Claims, 2 Drawing Sheets

(56) References Cited

U.S. PATENT DOCUMENTS

2015/0214872 A1    7/2015   Kanekawa et al.
2016/0181885 A1    6/2016   Yamasaki

FOREIGN PATENT DOCUMENTS

| CN | 105720747 A | 6/2016 |
| --- | --- | --- |
| DE | 10 2010 054188 A | 2/2012 |
| EP | 2 388 989 A | 11/2011 |
| EP | 2 450 260 A | 5/2012 |
| WO | 2016/180858 A | 11/2016 |
| WO | 2017/133875 A | 8/2017 |

OTHER PUBLICATIONS

Yousef Khalilollahi: "What platform ASICs are and when to use them", EE Times—Connecting the Global Electronics Community, Jan. 10, 2005.

* cited by examiner

HARDWARE IMPLEMENTED MOTOR CONTROL AND PLATFORM FOR EPS

CROSS REFERENCE TO RELATED APPLICATIONS

This application is a U.S. National Stage Entry of International Patent Application Serial Number PCT/EP2017/071747, filed Aug. 30, 2017, the entire contents of which are incorporated herein by reference.

FIELD

The present disclosure generally relates to a motor electric control unit of an electromechanical power steering mechanism.

BACKGROUND

In an electromechanical power steering mechanism a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion which is connected to the steering shaft in a torque-proof manner. Assist force is applied to a steering mechanism by driving an electric motor. A steering controller in form of an electronic control unit (ECU) controls the assist of the electric motor. In response to the vehicle velocity, the operator torque and the rotor position signal detected by a rotor position sensor, the controller determines the target motor torque and provides the signal through to the motor controller, where the motor currents are calculated via PWM (pulse-width modulation).

Currently, the ECU is implemented either as a single channel self-monitoring system, or a dual channel self-monitoring system. Current architecture offers limited scalability in regards of safety and availability requirements. The complete motor control with all sensor data processing and safety diagnostics is commonly implemented in software running on a safety-qualified microcontroller (MCU). The motor control and platform is a major contributor to resource consumption. The required safety integrity level is achieved with ASIL-D controllers on system level. A drawback of this type of motor control is that all diagnostics must be revalidated at each software release, because of possible interferences between common and project specific functions. Further, as it is not possible to have quick enough power module diagnostics implemented in software, the gate driver (GDU) selection is constrained, because it has to contain all diagnostics. In case the MCU fails, there is no actuation possible. For fail-safe operational systems, two MCUs are required.

Thus a need exists for a motor electric control unit of an electromechanical power steering mechanism which has an easy architecture and a high safety integrity level at low cost.

DETAILED DESCRIPTION

Figure 1:
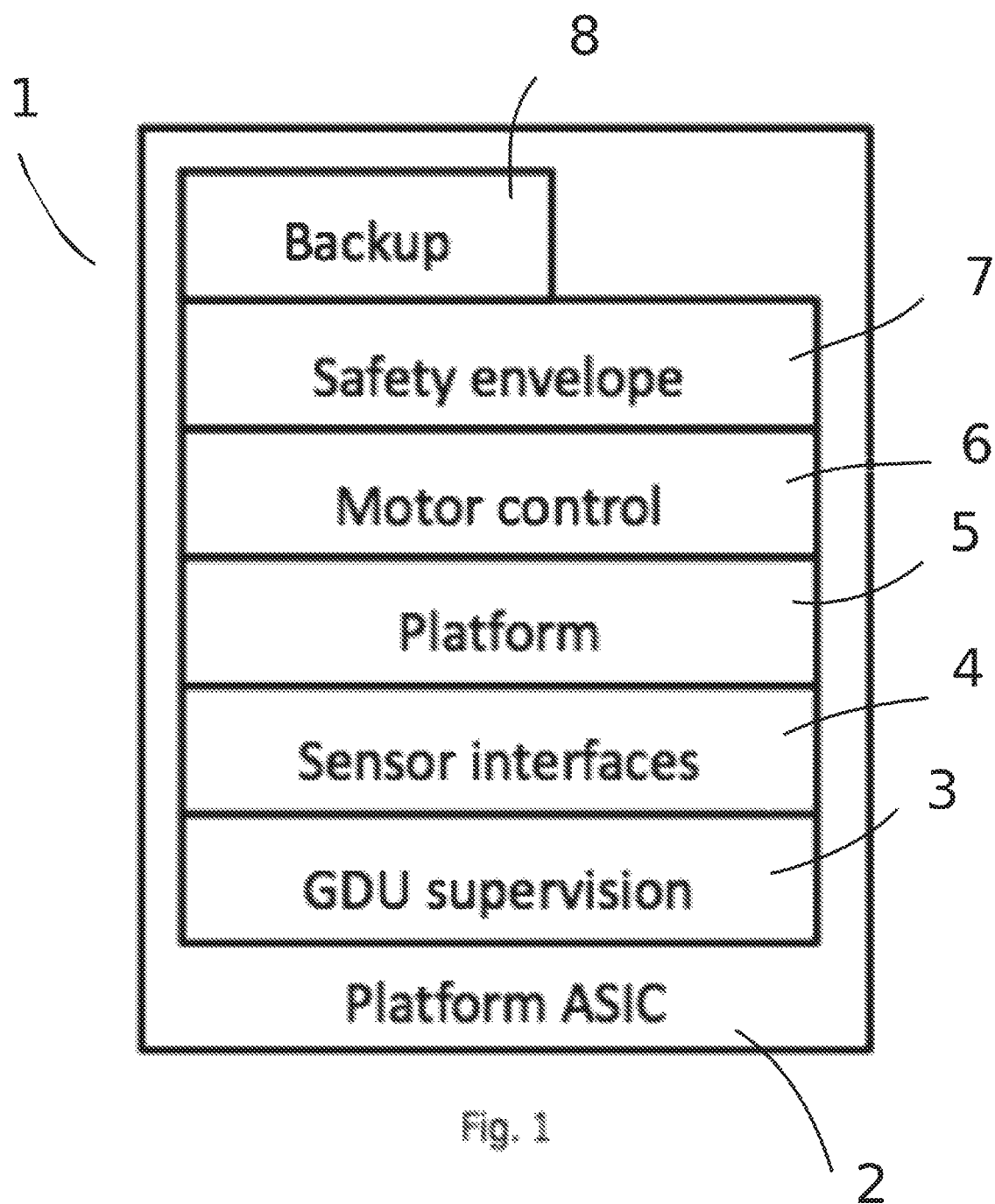
FIG. 1 is a schematic view of a motor electric control unit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a motor electric control unit of an electromechanical power steering mechanism and to an electromechanical power steering mechanism.

Accordingly, an motor electric control unit (ECU) for an electromechanical power steering mechanism, which controls current through an electric assist motor in response to sensed vehicle signals, is provided, wherein the ECU comprises an application specific integrated circuit (ASIC) design, that implements safety and platform features in hardware. The hardware implementation of the ASIC platform fosters reuse and drastically reduces testing/verification efforts in projects. The ASIC can provide basic assist (boost curve), which defines the static relationship between the driver applied input torque and the assistance torque produced by the motor, without a MCU. A MCU can, however, be implemented for a non-safety critical part of the functionality, so that the MCU has no special requirements.

It is preferred that the ASIC platform contains a gate driver unit (GDU) supervision module, that monitors the status of a power module and detects all possible failures, and that contains a pulse-width modulation unit for driving the electric motor. Further, the ASIC platform can contain a sensor interface circuit, which is responsible for the interfacing of all sensors of the ECU. Preferably, the ASIC platform contains a platform block, which is responsible for the electric motor management, including start-up testing of the paths and control of the electric motor in normal operation and safety shutdown mode. In a preferred embodiment the ASIC platform contains a motor control block, which is responsible for the implementation of the core motor control algorithm.

It is further advantageously, if the ASIC platform contains a safety envelope block, which implements a torque safety limiter function in order to ensure that the requested motor torque is always in a safe range.

Preferably, the ASIC platform contains a backup block, which implements a simple steering function in form of a boost curve, which defines the relationship between the indicated input torque and the assistance torque applied by the electric motor.

The parameters for the functional blocks can be set by an external MCU interface. Preferably, the ASIC platform is of such a design, that the ECU can be used in different vehicles without hardware modification, wherein the parameters are changed by software solely.

In one embodiment the ECU has two channels, with two ASIC platforms, one for each channel. This design can be used with or without a MCU. It is possible, that the two channels share one external MCU.

Further, an electromechanical power steering mechanism for assisting steering of a motor vehicle comprising an electric motor for steering assist and a torque sensor, the electric motor being adapted to apply an assistance torque in response to an output signal from the torque sensor indicative of the input torque applied by a driver of the vehicle to a steering wheel, with a motor electric control unit (ECU) according to the description above, is provided.

As shown in FIG. 1, the motor electric control unit (ECU) 1 has an application specific integrated circuit (ASIC) design, that implements safety and platform features in hardware. The ASIC platform 2 contains several functional blocks.

The lowest level is the GDU (gate driver unit) supervision module 3, that monitors the status of the MosFETs of the power module and detects all possible failures (FET short, FET cut, GDU not driving the FET correctly, FET in linear mode). The implementation is fully in hardware, in order to be able to react very quickly (range of a few microseconds) before a) a FET is damaged, or b) if after a FET fault a second consecutive fault occurs. This block 3 also contains the PWM generation block (not shown), that gets the voltage vector that shall be actuated, and emits the three phase PWM signal for the motor drive.

The next block of the ASIC is the sensor interface circuit 4. This block 4 is responsible for the interfacing of all sensors of the ECU, e.g. rotor position sensor, current measurement sensor, column torque sensor, steering wheel angle sensor, and temperature sensors. The sensors are preferably connected via analog signals, except for the torque and steering angle sensors, which use preferably SENT or SPC protocols. The implementation of this block converts the physical signals (analog or SENT/SPC) to an internal format and decodes the real values (current, angle, torque, temperature) from the electrical signal. The sensor diagnostics is advantageously fully implemented by hardware, for example a comparison between two channels in case of a dual channel system, a radius check for RPS, and range checks. The output of the module 4 is the qualified (reliable/not reliable/not available) signal set that can be used by further units.

The next block is called platform 5, and implements most of the functions that are currently done by the platform software. It receives the sensor signals from the above-mentioned sensor interfaces block 4, and uses these for further computations in hardware. It produces the electrical angle of the motor, the current vector out of the measured current samples, and based on the temperature, current, and motor speed, it calculates the necessary degradation (torque limit) degree. This block 4 is also responsible for the actuator management, which includes the start-up testing of the actuator paths (including GDU, FETs, and safety relays), and the control of the actuator in normal operation, and safety shutdown. Based on all diagnostics implemented in the blocks, it evaluates the necessary actions (ramp down assist, shut down actuator). It also contains a root cause analysis circuit to interpret the actual diagnostic picture. All these functions are preferably implemented in hardware.

The motor control block 6 is responsible for the implementation of the core motor control algorithm. This is a parallel PI structure consisting of two controllers (not shown). The input sensors' signals are supplied by the platform block 5, and the reference motor torque is supplied by a safety envelope block 7. The output of the block 6 is the voltage vector that is actuated on the motor. The actuation is done in the GDU block 3.

The safety envelope block 7 implements the torque safety limiter function. The input torque request from the steering application is received (running on an external, non safety rated MCU, which is not shown) and safety limitations are applied to it. The result is the reference torque request for the motor control. The main goal of the block 7 is to ensure that the requested motor torque is always in a safe range.

The backup block 8 is implementing a simple steering function that is able to provide assist even without an external MCU device. The control is a simple boost curve, relying on the input column torque, and an external boost look-up table.

All the blocks 3, 4, 5, 6, 7, 8 contain several parameters (like diagnostics limit, controller parameters, look-up tables) that can be set via an external MCU interface (not shown). Internally, these are stored in SRAM based registers, and protected with CRC and continuous checks. The aim of this solution is to be able to use the ASIC in different vehicles without hardware modification. This way, the basic safety measures are implemented in a stable hardware device, and only their parameters are changed by software.

Due to the hardware implementation, no revalidation is necessary for the safety functions in all releasesk due to built-in quick diagnostics. The GDU 3 can be of arbitrary type. Safety is ensured by the ASIC. The MCU selection is made easier, as all safety functions are implemented in hardware. The motor control frequency can be arbitrary high, because the hardware can support any frequency (up to MHz range). This results in better NVH (Noise, vibration and harshness) and dynamic behavior. The built-in backup steering control 8 can give assist without a MCU. The cost and complexity of a second MCU can be avoided.

Figure 2:
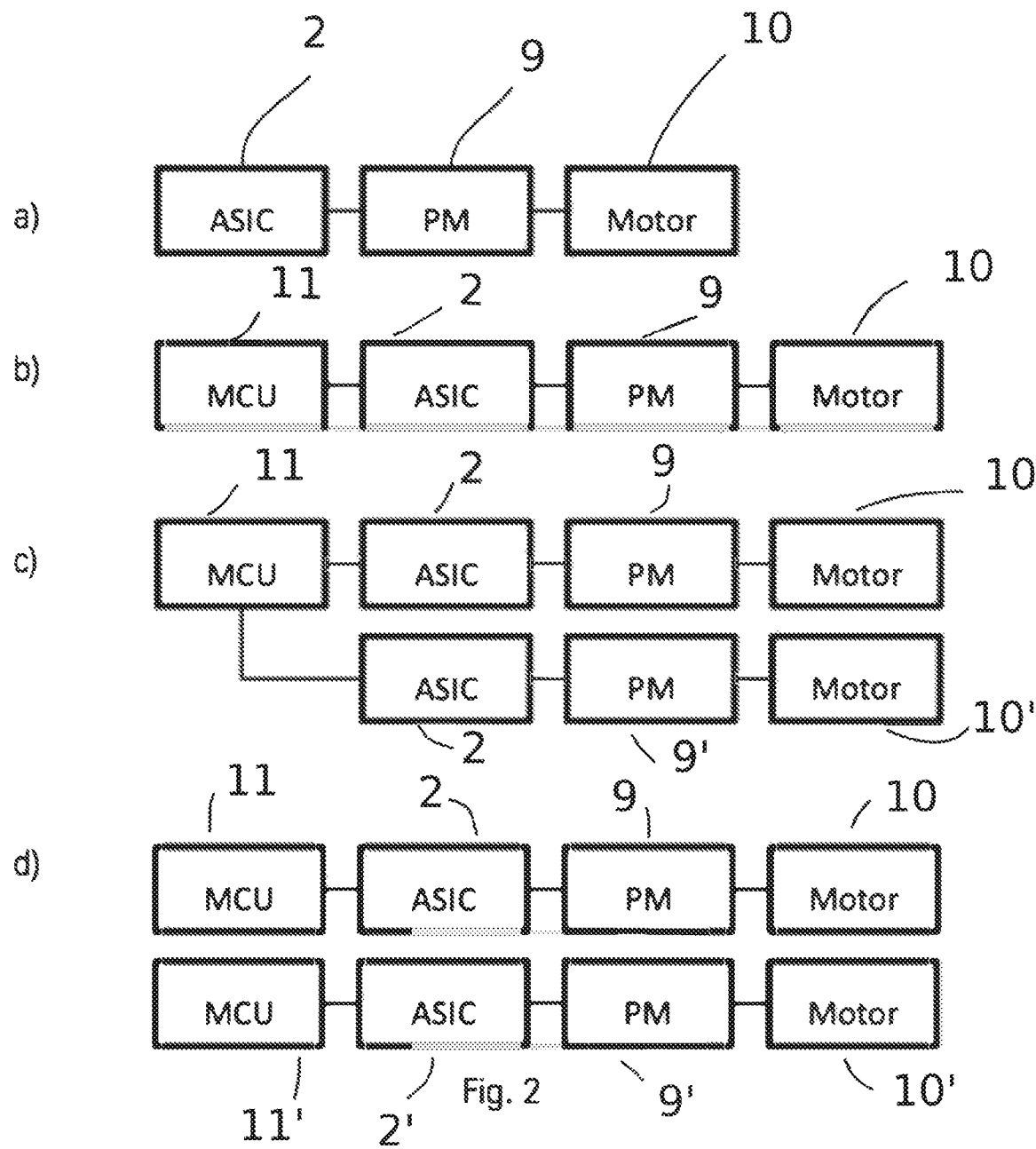
FIG. 2a is a diagram of one embodiment of the motor electric control unit.
FIG. 2b is a diagram of one embodiment of the motor electric control unit.
FIG. 2c is a diagram of one embodiment of the motor electric control unit.
FIG. 2d is a diagram of one embodiment of the motor electric control unit.

FIG. 2 shows four embodiments of the present invention. The different architectures can be built to meet diverse OEM requirements. All embodiments have in common that after the ASIC 2 a PM 9 is arranged, which actuates the calculated required motor currents for the electric motor 10.

Embodiment a) renounces to use an MCU. In contrast, embodiment b) has an MCU 11 upstream of the ASIC 2. The external MCU 11 can set the parameters for the blocks of the ASIC 2. Embodiments c) and d) have two channels, wherein in embodiment c) one MCU 11 for both channels is arranged upstream of the two ASICs 2,2' and wherein in embodiment d) two MCs 11,11' are used, one for each channel.

What is claimed is:

1. A motor electric control unit (ECU) for an electromechanical power steering mechanism, which is configured to control current through an electric assist motor in response to sensed vehicle signals, wherein the ECU comprises two channels, with an application specific integrated circuit (ASIC) for each channel, wherein each ASIC contains multiple functional blocks and is configured to implement safety features in hardware, wherein a single external MCU that is shared by the two channels is configured to set parameters for the functional blocks.

2. The motor electric control unit of claim 1 wherein each ASIC comprises a gate driver unit (GDU) supervision module, said GDU module configured to monitor the status of a power module and detect failures, and that comprises a pulse-width modulation unit for driving the electric assist motor.

3. The motor electric control unit of claim 1 wherein each ASIC comprises a sensor interface circuit configured to interface with all sensors of the ECU.

4. The motor electric control unit of claim 1 wherein each ASIC comprises a platform block configured to perform electric motor management, including start-up testing of paths and control of the electric motor in normal operation and a safety shutdown mode.

5. The motor electric control unit of claim 1 wherein each ASIC comprises a motor control block configured to implement a core motor control algorithm.

6. The motor electric control unit of claim 1 wherein each ASIC comprises a safety envelope block configured to implement a torque safety limiter function in order to ensure that a requested motor torque is in a safe range.

7. The motor electric control unit of claim 1 wherein each ASIC comprises a backup block configured to implement a simple steering function in form of a boost curve, which defines the relationship between an indicated input torque and an assistance torque applied by the electric motor.

8. The motor electric control unit of claim 1 wherein each ASIC is configured such that the ECU is usable in different vehicles without hardware modification, wherein parameters thereof are changed by software solely.

9. An electromechanical power steering mechanism for assisting steering of a motor vehicle comprising an electric motor for steering assist and a torque sensor, the electric motor being configured to apply an assistance torque in response to an output signal from the torque sensor indicative of the input torque applied by a driver of the vehicle to a steering wheel, with the motor electric control unit (ECU) of claim 1.

* * * * *